United States Patent [19]
Wolfe

[11] 4,342,176
[45] Aug. 3, 1982

[54] UNIT DOSAGE SYSTEM FOR TREE TRUNK IMPLANTATION TO CONTROL INSECT PESTS AFFLICTING TREES

[76] Inventor: Warren D. Wolfe, 222 Park Ave., Fremont, Nebr. 68025

[21] Appl. No.: 168,396

[22] Filed: Jul. 10, 1980

Related U.S. Application Data

[63] Continuation-in-part of Ser. No. 128,258, Mar. 7, 1980, abandoned.

[51] Int. Cl.³ .............................................. A01G 7/06
[52] U.S. Cl. .................................................... 47/57.5
[58] Field of Search ................................. 47/57.5, 53

[56] References Cited

U.S. PATENT DOCUMENTS 3,691,683  9/1972  Sterzik ................................ 47/57.5
3,706,161 12/1972  Jenson ................................ 47/57.5
3,716,600  2/1973  Magee ................................ 260/959

Primary Examiner—Robert E. Bagwill
Attorney, Agent, or Firm—Anthony A. O'Brien

[57] ABSTRACT

There is disclosed a unit dosage system for tree trunk implantation to control insect pests afflicting trees in which a plurality of vertically spaced apart holes (about 10–15 cm) preferably 10 holes, are drilled into the trunk and the holes are filled with about 0.1 to 2.0 gram unit dosage weights (as 100% active ingredient) of N-Acyl phosphoroamidothioates in a capsule as disclosed in Jensen U.S. Pat. No. 3,706,161. The active compounds are O-methyl or ethyl S-methyl or ethyl N-acetylphosphoroamidothioate which are technically pure (over 80%) and whose method of preparation is shown in Magee U.S. Pat. No. 3,716,600. A feature of the system is the provision of 10 capsules loaded with the active compound in a double or triple package within a package, each package being hermetically sealed to permit storage and shipment without giving off hazardous vapors. The inner package is a heat sealed metal foil lined package hermetically enclosing 10 capsules of the Jensen structure. Thus the user prepared by reading the instructions can quickly and efficiently make the necessary spaced vertical drillings, insert the capsule loaded with the highly effective agent, seal the opening with tree dressing and provide protection against citrus black fly, Jeffrey pine needleminer, Western spruce budworm, Zimmerman pine moth and the like.

7 Claims, 6 Drawing Figures

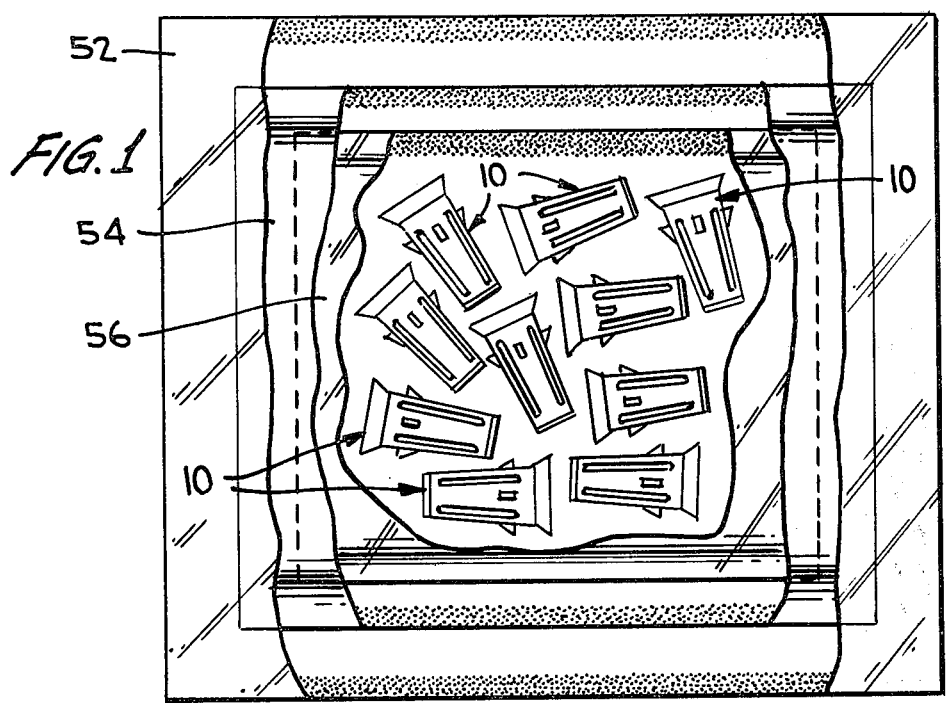
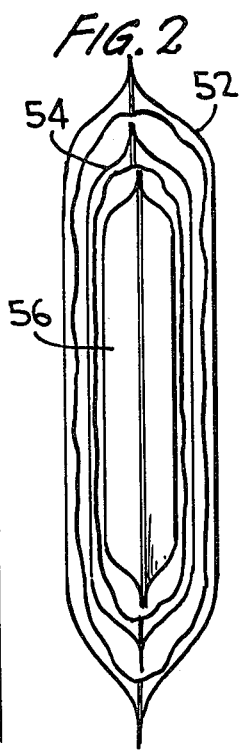
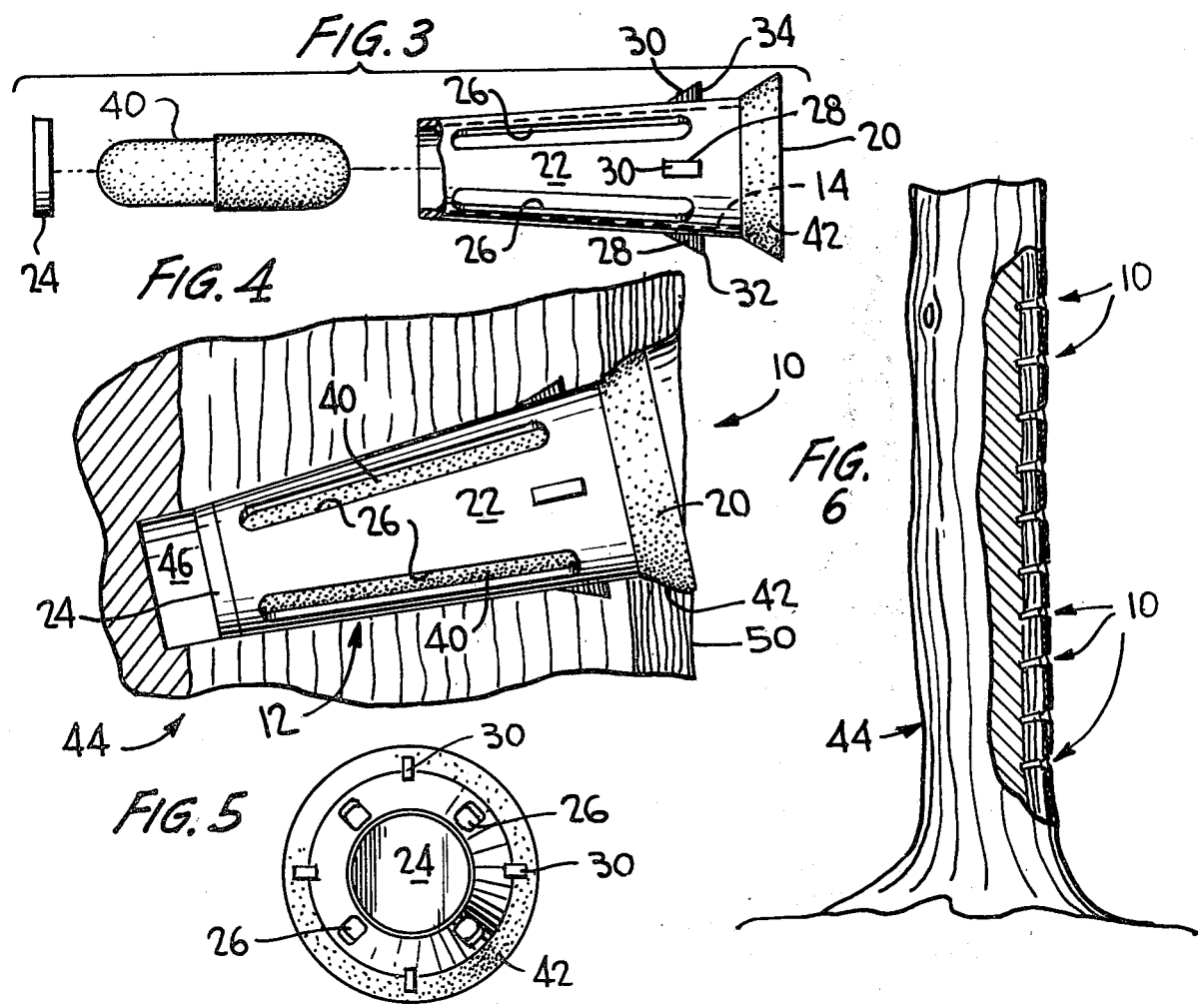

UNIT DOSAGE SYSTEM FOR TREE TRUNK IMPLANTATION TO CONTROL INSECT PESTS AFFLICTING TREES

CROSS-REFERENCE TO RELATED APPLICATION

This is a continuation-in-part application of parent application Ser. No. 128,258 filed Mar. 7, 1980 now abandoned, which parent application is incorporated herein by reference.

BACKGROUND OF THE INVENTION

1. Field of the Invention

This invention resides in the field of plant husbandry for implantation treatment of trees through a system of injection without pressure.

For example, systems for medicating trees by injecting predetermined quantities of chemical agents have been known for a long time, since at least as early as Davey et al U.S. Pat. No. 1,756,453, who taught the art injection of liquid under pressure and U.S. Pat. No. 1,999,458 to Hollister, who taught the art treatment with inorganic insecticide comprising salts of mercury, arsenic and iron, all toxic.

2. Description of Prior Art of Capsule Implantation

The prior art of organic phosphorus base insecticides applied by system of injection and implantation has long recognized the need to control efficiency by precise control of concentration of the active agent and safety to manufacturer and user be of the high degree of volatility and mammalian toxicity. Further the prior art is replete with teachings of different kinds of injection and implantation to aid in the dosing of the tree with effective amounts of the insecticidal agent under conditions designed to promote safety for the user.

Illustrative of such implantation devices are U.S. Pat. Nos. to Renner 1,727,939, Davey et al 1,756,453, Hollister 1,999,458, Zobrist 2,947,111, Mauget 3,254,449 and 3,304,655, Clarke 3,576,276, Tucker 3,608,239, Cravens 3,367,065, Sterzek 3,691,683, Jenson 3,706,161, Magee 3,716,600, Blake et al 3,832,803, Nix et al 3,834,075, Norris et al 3,864,874, Baynes et al 3,920,393, Freshel 3,992,813, Floyd et al 4,028,846 and Quast et al 4,144,673.

DISTINCTIONS OVER THE PRIOR ART

The infusion sytems of Davey et al, Mauget, Cravens, Clark, Tucker, Sterzik, Nix et al, Baynes et al, Freshel, Floyd et al and Quast et al all use liquids under pressure.

In contrast the unit dosage system of the present inventor does not use liquids under pressure.

The infusion systems of Zobrist, Norris et al and Blake et al all use a diluted liquid form of treating agent while the unit dosage system of the present invention does not and uses instead active ingredient in dry form.

The dry system of Hollister uses toxic and dangerous compounds of arsenic, mercury and sulfur while the unit dosage system of the invention does not use materials toxic to mammals.

The Mauget patents both disclose phosphate base insecticides (Column 1) which are diluted in a water medium (Column 4), the amount adjusted to be effective while in the present invention the active material is of the highest technical purity at the other end of the concentration scale. Moreover in Mauget the liquid under pressure is forced into the vascular system of the tree by a sharp pointed device while in the present invention, the outer cartridge structure which is barbed to prevent ejection by the tree releases the dry active ingredient contents slowly due to dissolving away of the captive capsule within the cartridge through access openings in the cartridge cylindrical side walls to provide total dosage of about 1 gram active ingredient per cartridge. Further, the acyl derivatives of the present invention are hydrolyzed by water which is used in the Mauget patents and are therefore used in the dry state by design to maximize the effectiveness of the dosage in total amounts of from about 3 grams to 10 grams, for the small trees up to the larger trees.

Pressure on the liquid as in the prior art may cause leaks and safety hazard to the user by liquid spills while the filled cartridge of the invention requiring no pressure, is safe.

Diluted liquid insecticide when spilled using the pressure art can impair the health and safety of the user while the cartridge of the system of the invention does not.

Injection without preparing a pre-drilled hole in the tree can be difficult in the hands of an inexperienced person while dropping the cartridge of the invention into place in a predrilled hole in the trunk by the system of the invention is both easy and safe.

As reported at pages 327, 356 and 371 in ACS Monograph 173 Chemical Carcinogens, Charles E. Searle, Editor, published by the American Chemical Society 1976 arsenic and arsenicals (compounds of arsenic) have been long suspected to act as carcinogens in the respiratory tract and a real hazard exists in using the system of Hollister 1,999,458.

As reported in de Ong text, Chemistry and Uses of Insecticides, Reinhold Publishing Corporation 1948, organic phosphorus base insecticides such as diethyl nitrophenyl thiophosphate are liquid, commonly known as parathion, and have effective action in control of codling moth, a tree pest.(P 249)

However, the volatility of these liquid organic insecticides and their toxicity has seriously limited their use, especially for trees where larger doses are required and where safety is improved by cutting down the concentration of the dangerous organic compound by diluting in water or inert oil. However pressure application of liquid increases the risk to unskilled users and it is the point of departure for the system of the present invention is to prepackage the dry concentrated (technically pure) insecticide of the present invention for the new use in treatment of specified pests for pine trees, spruce trees and citrus trees.

As pointed out in Magee U.S. Pat. No. 3,716,600 granted Feb. 13, 1973, at column 15 lines 1-8 where the insecticidal properties of N-acylphosphoroamidothioates are discussed "Many of the N-acylphosphoroamidothioates of this invention are more selective in their insecticidal activity than their non-acylated analogs. Thus, a given compound may be highly active against one insect species and relatively inactive against another. The preferred compounds of this invention are especially effective against roaches, houseflies, cabbage loopers, aphids, bollworm, armyworms and corn earworms."

It was unexpected to discover that highly concentrated (technically pure) dosages of N-acyl derivatives of O-alkyl-S-aliphatic hydrocarbyl phosphoroamidothioates and S-alkyl-S-aliphatic hydrocarbon phophoroamidodithioates can be prepackaged in a capsule in about 1 gram quantities to be highly effective for 30–60 day long term elimination of such pests as citrus blackfly, Jeffrey pine needleminer, Western spruce budworm, Zimmerman pine moth, birch leafminer, elm leaf beetle larvae, eastern tent caterpillar, fall webworm, honeylocust mite, Nantucket pine tip moth larvae, mimosa webworm, leaf folder (redbud), and the like. Uniquely, the total dosage may vary from about 3 grams to about 10 grams depending upon tree size. Each technically pure dry weight gram is one unit.

It was further unexpected to discover through lone experimentation over a period of several years that a very simple system of application rate and placement could be developed which has now been tested by experience wherein the number of implants required is determined by multiplying the tree trunk diameter by 3.14 and dividing by 4. To illustrate, a 10 inch diameter trunk is 31.4 inches of product divided by 4, or 8, the number of implants required. The implants are applied when the first form of the insect is noticed and implants are at 4 inch vertical intervals, using a tape measure and proceeding with ½ inch drill at 4 inch spacings spiraling up and around the base and applying tree wax or tree patch compounds to the opening after the cartridge implant.

This ability of the user to implant the precise amount required based upon the age and size of the tree and based upon the obvious indications for application such as the appearance of wingless forms of certain insects or the eggs of other insects which those skilled foresters recognize, represents an important advantage which is characteristic of the unit discharge system which is the characteristic of the present invention. The provision of 10 capsules, each pre-filled in 10 implant structures, assures the user that the total number of 10 will be available for the treatment and for 99% of the sizes and types of trees which are required to be protected against insect pests. The user with the aid of simple instructions can quickly bring to bear proper measures to assure that the trees will be saved. The dosage may vary from about 3 units to about 10 units, most tree diameters requiring the latter where 1 unit is about 1 gram of technical medicament.

OBJECTS OF THE INVENTION

An object of the invention is to provide a unit discharge system for tree trunk implantation to control insect pests afflicting ornamental trees and citrus trees which can be applied at the proper application rate determined by simple calculation based upon the tree trunk diameter, the system with instructions being available in a hermetically sealed triple package to provide safety in manufacture, storage and use, with the implants enclosed within the package being adequate in number for infestation control thereby assuring long-time cleanup of the tree stands in forest areas or in urban areas where such trees are subject to harmful insect activity. A further object of the invention is to provide an easily understood method of control for the non-skilled user for controlling insect pests.

Still further objects of the invention will be apparent from the following description and illustration of the invention in the drawings herein.

SUMMARY OF THE INVENTION

This invention provides a unit dosage system for tree trunk implantation using one-tenth gram to two gram dosages of N-acyl derivatives of phosphoroamidothioates to control insect pests afflicting ornamental and citrus trees in which a plurality of vertically spaced apart holes (about 10–15 cm) preferably 10 holes, are drilled into the trunk and the holes are filled with these unit dosage weights (about 0.8 to 1.6 grams 100% active ingredient) in the capsule structure having sap soluble portions as disclosed in Jenson U.S. Pat. No. 3,706,161 granted Dec. 19, 1972. In the preferred embodiments the active compounds are O-methyl or ethyl S-methyl or ethyl N-acetylphosphoroamidothioate which technically pure (over 80%) and whose method of preparation is shown in Magee U.S. Pat. No. 3,716,600. An essential feature of the system is the provision of triple hermetically sealed 10 pre-packaged tree medication capsules each loaded with the active compound. Each package is hermetically sealed to permit storage and shipment without giving off hazardous vapors. The inner package is opaque and is a heat sealed metal foil lined package hermetically enclosing 10 capsules of the Jensen structure. The intermediate is transparent comprising vinyl foil, polyethylene or saran or the like and may contain instructions which can be read by the user before opening the inner package containing the capsules. The outer package is also transparent and aids in displaying or hanging the package on a pegboard hook when provided with a hole. Thus the user, prepared by reading the instructions, can quickly and efficiently be prepared for the implantation task and then make the necessary spaced vertical drillings, preferably in a spiral, then insert the Jenson capsule loaded with the highly effective agent, thereafter seal the opening with tree dressing and provide protection against citrus blackfly, Jeffrey pine needleminer, Western spruce budworm, Zimmerman pine moth and numerous other ornamental tree pests. The protection is immediately effective for two to three months in heavily infested forest areas or orchards, and need not be done more than twice every five years. The dosage may vary from about 3 grams of technical grade dry medicament to about 10 grams of technical grade dry medicament, each cartridge unit being about 1 gram (85%) active ingredients, 15% inert.

BRIEF DESCRIPTION OF THE DRAWINGS

FIG. 1 is a side elevational view of a triple package and contents of pre-filled tree medication capsules, 10 in number, in accordance with the invention.

FIG. 2 is a sectional view along lines 2—2 in FIG. 1.

FIG. 3 is an exploded view showing the pre-filled capsule of FIG. 1.

FIG. 4 shows the placement of the cartridge within the pre-bored hole in the trunk of a tree.

FIG. 5 is an end view of the assembly of FIG. 3.

FIG. 6 is a diagrammatic view of 10 cartridge end cap capsule assemblies in place at the recommended 4 inch intervals in a tree trunk and shown along a vertical line for purposes of clarity rather than along a spiral vertical line which is the preferred mode of implantation.

DESCRIPTION OF THE PREFERRED EMBODIMENT

In FIGS. 1 and 2 there is shown a triple package comprising outer package 52, intermediate package 54, and inner package 56, each of the packages being heat-sealed around the edges and each being rectangular in shape for convenience, although other shapes may be employed.

Inner package 56 is constructed of aluminum foil laminated polypropylene which bears operating instructions and identifying indicia and the inner edges are provided with suitable heat-responsive adhesive to assure an hermetic seal when the contents of the barbed cartridge end cap pre-filled capsule assembly has been placed within the inner package 56 by the manufacturer. At the manufacturing site proper precautions can be taken to protect the workers against the effects of the volatile fumes and odors which emanate from the concentrated dry contents, e.g., the insecticide. The assemblies 10 are suitably packed within the inner package 56, the preferred number being 10, although for smaller trees 6 or 8 may be used and for very large trees a larger capsule-cartridge size may be used. The intermediate heat-sealed package 54 serves to retain the inner package and assures that under no circumstances will any odors, which most people find unpleasant, will emanate from the unit. The instructions are printed on the outside of the inner package 56 and on the outside of the intermediate package 54 and give warnings that the package is to be stored in a cool place and after opening is to be resealed by re-pressing the lip of the inner package which has been mechanically pulled apart. Thus opening the package under conditions of good ventilation, storing in a cool place, re-sealing under conditions of good ventilation and using the triple package structure for storage where two or three capsules may be retained assures the user that all of the material will be applied in the tree and not thrown out.

The pre-packaging of the capsule 40 by filling with inert material takes into account the capsule size and the charge of insecticide. One gram quantity of insecticide fits completely into the capsule 40 and the inner disc portion of the end cap 24 serves to close the left end (as viewed in FIG. 3) of a hollow shank 22. Cartridge 10 has a hollow cavity 14 defined by a solid head 20, the hollow shank 22 and the solid end 24 with longitudinal openings 26 in the wall of the shank 22. The shank 22 also includes a plurality of anti-rejection barbs 28 spaced about the shank periphery between the openings 26. Each barb 28 has a lead-in surface 30 which rises from the shank periphery to a point 32 where it meets a retaining shoulder 34 rising rodially from the shank periphery. Tree wound dressing 42 is applied to the head 20 of the cartridge 20. The sap which flows through the vascular system of the tree 44 dissolves the material forming the capsule container 40 and the sap enters the cartridge through longitudinal openings 26 (see FIG. 3). The end cap 24 may be heat sealed to the cartridge body or may be adhesively sealed or it may be press-fitted into the inner wall of the hollow shank 22.

In the embodiment shown in FIG. 4 the end cap is heat sealed. Because of the volatility and low melting point characteristics of the preferred n-acyl derivatives of phosphoroamidothioates, the triple package of FIG. 1 help to contain the unusual odors emanating from these materials. Most of the products which are listed in Table II of Magee patent 3,716,600 have been tested by the present inventor and it has been found after long and careful testing over many growing seasons that the compounds in such Table II (which table is incorporated herein by reference) in lines 1, 2, 5, 6, 7 and 8 provide the best results in trees. These compounds are the highest in purity available as technical grade material from the manufacturer and all have a similar volatility and melting range which is above about 60° centigrade. Although these compounds may be available in an oil, the dry form is preferred. The odor is not masked by the oil.

OPERATION USING THE PRE-FILLED TREE IMPLANT CARTRIDGES OF THE INVENTION

The tools necessary to properly "implant" the cartridge are common to the average tool kit. The cartridge of Jensen U.S. Pat. No. 3,706,161 is fitted with a gelatin capsule and a plurality of implants as shown in FIG. 6 herein to provide optimum results in dissolving the medication by the phloem layer of the tree trunk. The tree wound factor is minimized while maximum assurance is provided for the tree's cambium to quickly callus over the implant sites, using conventional grafting wax, tree patch wax or tree sealant. The sealant may include an insect repellant.

The proper tools comprise:

1. A hand brace with a sharp ship-auger bit to provide the cleanest cut,
2. Proper size drill bit based upon the diameter of the tree trunk.
3. Hammer to drive the filled cartridge assembly into the hole as shown in FIG. 6,
4. Flat end punch, or bolt, or dowel in order to recess the cartridge beneath the cambium, and
5. Tree wound dressing.

An electric or power drill may be used and a sharp spiral bit is recommended.

To determine the number of implants to be made the filled tree implant cartridge is selected based upon the trunk diameter to determine if the spacing between implants 2 in FIG. 6 is to be 3 or 4 or 6 inches a 1", 1½" or 2" capsule may be used. The implant sites are drilled at a uniform vertical spacing preferably spiraling up and around the lower tree trunk surface starting at about 6" from the ground. For example, on a typical 9" DBH (diameter at breast heighth) (28 inch circumference) tree, the implant spiral should be completed between 6 inches and 24 inches from the soil line. On low branching trees one must make certain the implants are placed beneath the lower branches. This will insure adequate distribution of the chemical throughout the tree.

The cartridges are pressed into the pre-drilled holes 46 in. the tree trunk, and then using a hammer and a flat end punch, the cartridge is driven into the tree, recessing the large end slightly beneath the cambium surface, which is below the bark 50. The insecticidal specific chemical organophosphate imparts a slow release of dry high concentration of medication which is safely implanted inside the tree, where the natural sap flow will systemically absorb the chemical and distribute it throughout the tree, without having the chemical insecticide come into contact with the person making the implantation.

The cartridge head securely plugs the small wound made to the tree trunk. However, it is desirable that a light wound dressing be sprayed or brushed over the implant site. This provides further protection until the cambium calluses over.

Dry plant nutrients which are known in the art may be mixed with the unit dosage of systemic insecticide by the implantation method of the invention.

Extensive research has disclosed that in certain cases one application has provided a beneficent response in the tree for 2 to 3 growing seasons and normally one would not be expected to require more than 2 treatments during a 5 year period.

Obviously the implantation unit dosage system of the invention may be combined with either conventional spray treatment or with soil treatment or with both. If a second treatment is made it is preferred that the second spiral pattern be the reverse of the previous spiral pattern of drilled holes to assure that there is no attempt to drill into or to remove the cartridges which have been previously implanted.

It is seen that proper timing of the application of the unit dosage system of the invention is based upon recognition of the maximum upward flow of tree sap which varies with different species of trees based upon moisture, time of the year, time of the day, tree vigor, root development and light intensity at the time of treatment.

Inasmuch as the present invention is subject to many modifications, variations and changes in details, it is intended that all matter contained in the foregoing description as shown in the accompanying drawing shall be interpreted as illustrative and not in a limiting sense.

What is claimed is:

1. A unit dosage system for tree trunk implantation comprising:
    a sealed package assembly containing a plurality of sealed cartridges,
    each cartridge having a capsule containing a filling of technically pure dry N-acyl derivative of phosphoramideothioate;
    each cartridge being barbed to resist ejection by the tree and being adapted to release the filling into the tree trunk, and
    the amount of said filling providing protection against insect pests when said plurality of said cartridges are implanted in pre-bored holes, one for each cartridge, in the trunk of the tree.

2. The system of claim 1 wherein there are 4 cartridges in said package assembly.

3. The system of claim 1 wherein there are 10 cartridges in said package assembly.

4. The system of claim 1, 2 or 3 wherein said sealed package assembly comprises an inner sealed package containing the sealed cartridges, an intermediate sealed package containing the inner sealed package, and an outer sealed package containing the intermediate sealed package.

5. A unit dosage system for tree trunk implantation comprising;
    a triple package assembly, each package formed of heat sealable material, said assembly including an inner foil laminated hermetically sealed package containing a plurality of barbed cartridges with filled gelatin capsules, an intermediate hermetically sealed package to provide protection against odor emanating from the filling of the capsules, and an outer hermetically sealed transparent package;
    the filling of said capsule being in an amount in a range of from one-tenth gram to two grams of technically pure dry N-acyl derivative of phosphoramideothioate;
    each cartridge being barbed to resist ejection by the tree and having adapted to release the filling through dissolving of the gelatin by the sap of the tree trunk after implantation below the cambium; and
    the amount of said filling providing protection against insect pests when said plurality of said cartridges are implanted in the trunk of the tree, in pre-bored holes, one for each cartridge.

6. The system of claim 5 wherein there are 10 cartridges in said inner package.

7. A method of dosing a tree against insect infestation by implanting a plurality of unit dosage cartridges comprising:
    determining the number of cartridges by measuring the diameter of the tree at breast height, multiplying by 3.14 and dividing by 4 to determine the number of pre-bored holes $1\frac{1}{4}$–$1\frac{1}{2}$" long in the trunk of the tree vertically spaced from a height of 6 inches from the soil line and boring said number of holes along a spiral path, each hole being spaced about 4 inches from the neighboring hole;
    inserting a barbed cartridge containing a gelatin capsule filled with one-tenth to two grams of N-acyl phosphoramidothioate containing the unit dosage of filling, one cartridge into each hole until all holes are filled;
    driving the cartridge to a location in said hole with the rear end below the cambium; and
    sealing the pre-bored hole with the cartridge driven into place with the tree wax or tree sealant.

* * * * *